United States Patent [19]
Bitsch et al.

[11] 3,983,428
[45] Sept. 28, 1976

[54] INTERCHANGEABLE CONNECTOR MEANS FOR ELECTRIC MOTOR OPERATION ON EITHER OF TWO SUPPLY VOLTAGES

[75] Inventors: Richard C. Bitsch; Lawrence E. McCrary, both of St. Louis, Mo.

[73] Assignee: Emerson Electrical Co., St. Louis, Mo.

[22] Filed: June 10, 1974

[21] Appl. No.: 477,686

[52] U.S. Cl. ................................................ 310/71
[51] Int. Cl.² ........................................ H02K 11/00
[58] Field of Search ........................ 310/68 R, 71; 318/225 R, 225 A, 220 R

[56] References Cited
UNITED STATES PATENTS

| | | |
|---|---|---|
| 3,012,159 | 12/1961 | Drusedow ............................ 310/71 |
| 3,231,767 | 1/1966 | Powell ................................. 310/71 |
| 3,350,587 | 10/1967 | Turk ................................... 310/71 |
| 3,602,748 | 8/1971 | Locke .................................. 310/71 |

*Primary Examiner*—Donovan F. Duggan
*Attorney, Agent, or Firm*—Charles E. Markham

[57] ABSTRACT

One half of a main motor winding and a shunting lead are connected between one side of a power source and two of the terminals of a three terminal plug-in receptacle; the other half of the main winding and a second shunting lead are connected at one end to the other side of the power source and each has a plug-in terminal connected to its other end for selectively connecting the two winding halves in parallel or in series across the power source.

1 Claim, 13 Drawing Figures

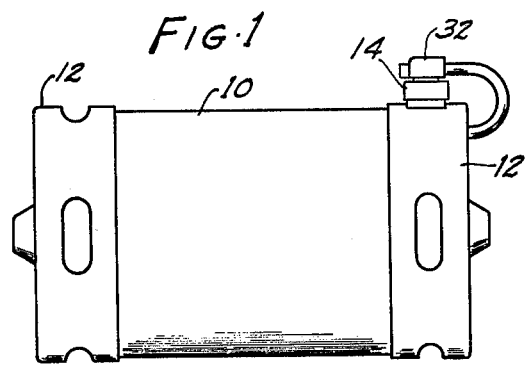
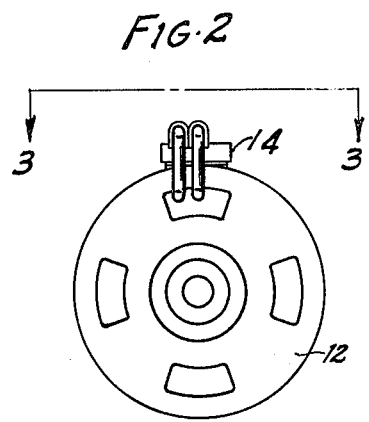
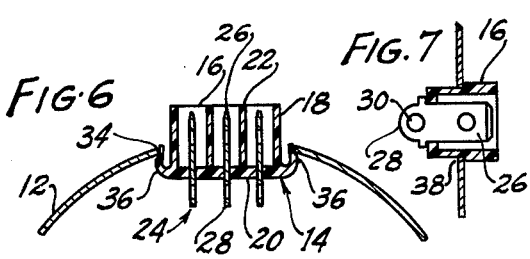
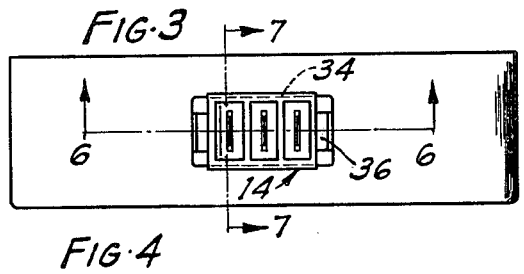
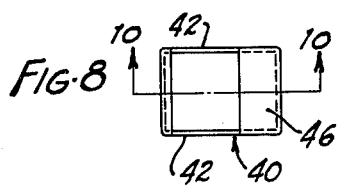
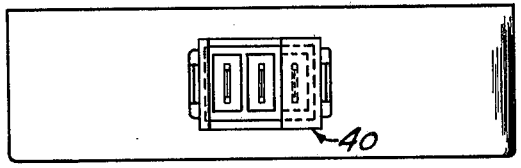
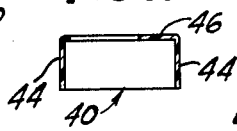
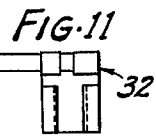
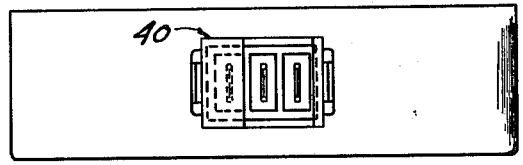
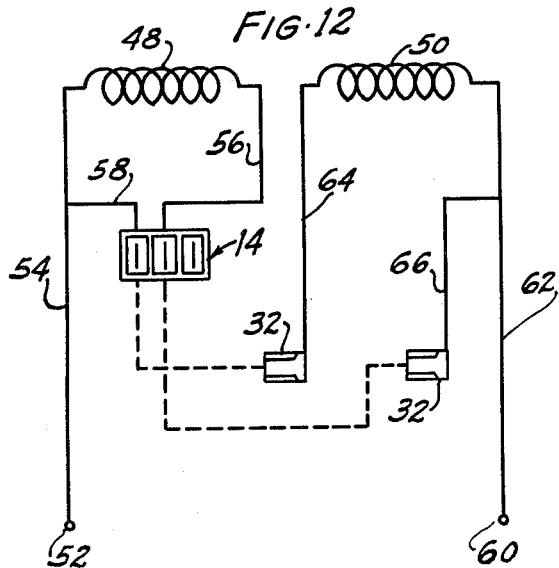
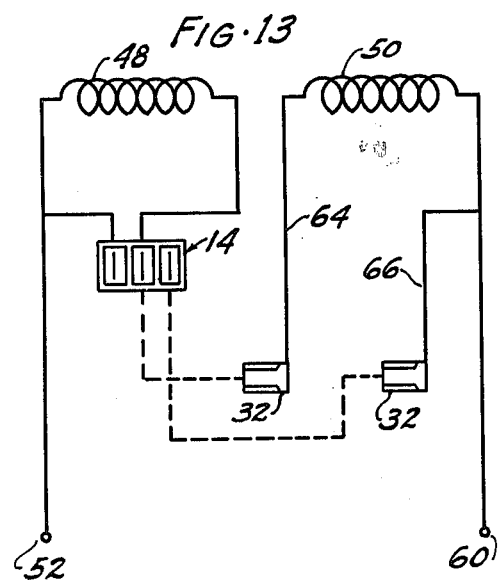

INTERCHANGEABLE CONNECTOR MEANS FOR ELECTRIC MOTOR OPERATION ON EITHER OF TWO SUPPLY VOLTAGES

This invention relates to means for the convenient interchangeable connection of single phase, squirrel-cage motor windings so as to adapt them for operation on either of two power supply voltages.

An electric motor having convenient means for interchangeably adapting it to operation, for example, on either a 120 or 240 volt alternating power supply without significant additional manufacturing cost is of considerable advantage to the manufacturer, the dealer, and the user.

Accordingly, it is an object of this invention to provide an electric motor having conveniently interchangeable internal connector means whereby the motor may be operated on either of two power supply voltages, one of which is substantially twice that of the other.

A further object is to provide an electric motor having particularly simple, economical, and safe means for interchangeably connecting two halves of the main motor winding either in series or in parallel across a power supply.

Further objects and advantages will appear from the following description when read in connection with the accompanying drawing.

In the drawing:

FIG. 1 is a side elevational view of an electric motor having a plug-in receptacle mounted in an end shield thereof constructed in accordance with the present invention;

FIG. 2 is an end elevational view of the motor shown in FIG. 1;

FIG. 3 is an enlarged top plan view of one of the motor end shields taken along line 3—3 of FIG. 2, showing the three terminal plug-in receptacle mounted therein. In this view, the receptacle is shown with the cover removed;

FIG. 4 is an enlarged top plan view similar to FIG. 3, except that the reversible cover member is shown mounted on the receptacle in a position to cover the right-hand terminal;

FIG. 5 is similar to FIG. 4 except that the reversible cover is shown mounted on the receptacle in a position to cover the left-hand terminal;

FIG. 6 is a cross-sectional view of the plug-in receptacle taken along line 6—6 of FIG. 3;

FIG. 7 is a cross-sectional view of the plug-in receptacle taken along line 7—7 of FIG. 3;

FIG. 8 is a top plan view of the reversible cover member;

FIG. 9 is an end elevational view of the reversible cover member;

FIG. 10 is a cross-sectional view of the reversible cover member taken along line 10—10 of FIG. 8;

FIG. 11 is a side elevational view of one of the flag terminals;

FIG. 12 is a diagrammatic view showing substantially equal portions of the main field winding of the motor connected in parallel across the supply terminals; and FIG. 13 is a diagrammatic view showing the portions of the motor field winding connected in series across the power supply terminals.

Referring to the drawing in more detail, an electric motor is generally indicated at 10 having end shields 12, in one of which is mounted a three terminal plug-in receptacle, generally indicated at 14. The receptacle 14 comprises an elongated rectangular casing of semi-rigid thermoplastic material formed by injection molding and includes side walls 16, shorter end walls 18, a floor 20, and transverse partition walls 22 forming three compartments.

Three elongated flat terminal members 24 extend through the floor of the receptacle, each having a portion 26 extending above the floor 20 into one of the compartments and a portion 28 extending below the floor and having a perforation 30 therein for receiving and facilitating the connection thereto of a lead wire. The terminal portions 26 upstanding in the several compartments are adapted to be received in push-fit lead connectors shown as conventional flag terminals 32, see FIG. 11. The terminal members 24 are rigidly fixed in the floor 20 of the receptacle as by positioning them in the molding die as inserts.

The side wall of the end shields 12 has an elongated rectangular perforation 34 therein adapted to receive the receptacle 14, see FIGS. 3, 6, and 7. The perforation 34 is somewhat longer than the body of receptacle 14, and the receptacle is provided with deformable portions 36 extending from the end walls thereof in the plane of the floor. Portions 36 are adapted to be deformed when the receptacle 14 is pressed into the aperture 34. The receptacle body is, however, somewhat wider than the aperture 34, and the side walls thereof are reduced in thickness intermediately of their height to provide shoulders 38 which limit the insertion of the receptacle in the aperture 34.

An elongated rectangular cover member 40 adapted to fit over the upper open side of receptacle 14 has side walls 42, shorter end walls 44, and a top wall portion 46 at one end thereof having sufficient width to enclose the upper open end of one of the end compartments of the receptacle. The cover member 40 is also preferably constructed of semi-rigid thermoplastic material and has a snug fit on the receptacle.

Referring to FIGS. 12 and 13, the windings indicated at 48 and 50 represent substantially equal portions of the main stator windings of the motor 10 to be connected across power source terminals 52 and 60. One end of winding portion 48 is connected to one side of a power source at terminal 52 via a main external lead 54, and the other end of winding 48 is connected to the lower internal end portion 28 of the intermediate terminal of receptacle 14 via a lead 56. There is also a lead 58 connected at one end to the lower internal end portion 28 of the left-hand terminal of receptacle 14 and at its other end to the power source terminal 52 via the external lead 54.

One end of winding portion 50 is connected to the other side of the power source at terminal 60 via a main external lead 62. Connected to the other end of winding portion 50 is a lead 64 having a push-fit lead connector or flag terminal 32 at the free end thereof. There is also a lead 66 connected at one end to the power source terminal 60 via the lead 62, which has a push-fit lead connector 32 at its other end.

When it is desired to connect the winding portions 48 and 50 in parallel across a power source having, for example, 120 volts, the flag terminal 32 on the end of lead 64 is pushed on the left-hand receptacle terminal and the flag terminal on the end of lead 66 is pushed on the intermediate receptacle terminal, as indicated by dotted lines in FIG. 12. Prior to pushing the flag terminals on the receptacle terminals, the cover member 40 is pressed on the receptacle in the position shown in FIG. 4 so as to cover the right-hand receptacle terminal.

When it is desired to connect the winding portions 48 and 50 in series across a power source having, for example, 240 volts, the flag terminal 32 on the end of lead 64 is pushed on the intermediate receptacle terminal and the flag terminal on the end of lead 66 is pushed on the right-hand receptacle terminal, as indicated by dotted lines in FIG. 13. Prior to pushing the flag terminals on the receptacle terminals, the cover member 40 is pressed on receptacle 14 in the position shown in FIG. 5 so as to cover the left-hand receptacle terminal.

The right-hand receptacle terminal has no connection to the winding portions, but is included to provide a safe, fixed position for the flag terminal on the end of lead 66 when the motor winding portions are in series, as in FIG. 13. The leads 64 and 66 are insulated and extend from their connection at one end of the motor winding portion 50 through air vents in the end wall of end shield 12 to the exterior for connection to the receptacle terminals, as indicated in FIGS. 1 and 2. The flag terminals 32 are also provided with conventional insulating caps, as indicated in FIG. 1.

While the described interchangeable connector means is particularly adaptable economically to use with single phase, squirrel-cage motors, it is to be understood that with modifications within the spirit of the invention the connector means may be employed on polyphase motors. Also, while only divided portions of the main motor windings are indicated as being interchangeably connected, auxiliary windings may also be included. Usually, however, in the case of smaller single phase motors, these auxiliary windings may be connected in parallel with one portion of the divided main winding through a capacitor, or a starting switch, or both.

We claim:

1. In an electric motor having a casing and a stator winding therein, means for interchangeably connecting two portions of said winding in parallel or in series across a power source comprising;

a first main lead for connecting one end of a first winding portion to one side of a power source, and a second main lead for connecting one end of a second winding portion to the other side of the power source, a receptacle mounted in an aperture in a wall of said casing comprising;

a floor substantially closing said aperture, four outwardly extending side walls forming a rectangle, and two partitioning walls forming a series of three open end compartments, three terminals fixed in said receptacle floor each having a portion extending interiorly and a portion extending exteriorly in one of said compartments and arranged for cooperation with a push-fit lead connector, a first internal lead connecting said one end of said first winding portion to said interiorly extending portion of a first terminal, and a second internal lead connecting the other end of said first winding portion to said interiorly extending portion of a second terminal, first and second internally and externally extending leads connected at their internal ends to the opposite ends of said second winding portion and each having a push-fit connector at their exterior end for engagement with said exterior extending portion of said terminals, a cover member comprising four side walls forming a rectangle arranged for push-fit assembly over said receptacle side walls in either of two end-for-end positions, and said cover member having a bottom wall portion enclosing one end compartment of the series when assembled in said one position and enclosing the other end compartment when assembled in said other position.

* * * * *